United States Patent [19]

Barker et al.

[11] 4,104,078

[45] Aug. 1, 1978

[54] METHOD FOR SEPARATION OF DEXTRANS

[75] Inventors: Philip Edwin Barker, Birmingham; Brian William Hatt, Bromsgrove; Frederick John Ellison, Liverpool, all of England

[73] Assignee: Fisons Limited, London, England

[21] Appl. No.: 802,783

[22] Filed: Jun. 2, 1977

[30] Foreign Application Priority Data

Jun. 16, 1976 [GB] United Kingdom ............... 24908/76

[51] Int. Cl.$^2$ .......................... C08B 37/02; C13L 3/00
[52] U.S. Cl. .................................. 127/46 R; 127/36; 127/46 A; 195/31 P; 210/31 C
[58] Field of Search .................. 127/34, 46 R, 46 A, 127/36, 38; 195/31 P; 210/31 C

[56] References Cited

U.S. PATENT DOCUMENTS

| | | | |
|---|---|---|---|
| 2,565,507 | 8/1951 | Lockwood | 195/31 P |
| 2,644,815 | 7/1953 | Gronwall | 195/31 P |
| 2,660,551 | 11/1953 | Koepsell | 195/31 P |
| 2,685,579 | 8/1954 | Wimmer | 195/31 P |
| 2,687,368 | 8/1954 | Stoycos | 127/36 X |
| 2,717,853 | 9/1955 | Shurter | 195/31 P |
| 2,719,147 | 9/1955 | Wolff | 127/34 X |
| 2,727,838 | 12/1955 | Dalter | 127/36 |
| 2,789,066 | 4/1957 | Novak | 127/34 X |
| 2,972,567 | 2/1961 | Novak | 195/31 P |
| 2,988,482 | 6/1961 | Novak | 195/31 P X |
| 3,184,334 | 5/1965 | Sargent | 127/34 X |
| 4,022,637 | 5/1977 | Sutthaff | 127/46 R X |

FOREIGN PATENT DOCUMENTS

1,418,503  12/1975  United Kingdom.

OTHER PUBLICATIONS

Chemical Abstracts, 66:108213y (1967).
Chemical Abstracts, 82:166845x (1975).

*Primary Examiner*—Sidney Marantz
*Attorney, Agent, or Firm*—Merriam, Marshall & Bicknell

[57] ABSTRACT

A chromatographic method of separating a fluid mixture of dextrans of differing molecular weights into two fractions. The chromatographic method is carried out with an apparatus having a plurality compartments according to a scheme involving sequential valve operation and provision of carrier fluid.

11 Claims, No Drawings

METHOD FOR SEPARATION OF DEXTRANS

This invention relates to a novel separation process.

Dextrans of suitably low molecular weights for use as plasma volume expanders, and for use in the production of iron-dextran, have for many years been made by the hydrolysis of native dextran and subsequent separation of the hydrolysate into fractions suitable for the intended end use. The separation of the hydrolysate into various fractions has in general involved the fractional precipitation of the dextran with aqueous ethanol of varying concentrations. This procedure is generally disadvantageous in that it involves the use of large volumes of ethanol, which produce a substantial fire hazard and also are expensive to recover, e.g. by distillation. Other methods of fractionating polymeric materials are also known, and indeed some of these, notably liquid phase gel chromatography, are widely used on a laboratory scale, particularly for the analysis of polymeric materials. However liquid phase gel chromatography is almost invariably carried out on a batch basis and is not readily adapted to production scale operation. Furthermore the material fed to liquid phase gel chromatography columns generally has to consist of a solution containing less than about 5% by weight of the material to be separated, the solvent being the liquid phase used on the column. The use of feeds of this concentration generally leads to a concentration on the column of the material to be separated of less than about 1% by weight.

We have now found that very high concentrations of dextrans may be used on sequential chromatographic equipment using an 'apparent rotation' of the column to obtain separation of the dextran into two fractions.

The chromatographic equipment suitable for use in the process of the present invention comprises a plurality of compartments which contain an appropriate packing material, value-containing conduits interconnecting the compartments to provide a closed loop column, at least one additional controlled fluid inlet and at least one additional valve controlled fluid outlet for each compartment, and means for sequential operation of the valves such that, in use, each compartment undergoes, and at any one time there is at least one compartment undergoing, the following operations:

(i) being fed with the fluid mixture to be separated,
(ii) being fed with a carrier fluid,
(iii) having carrier fluid and any entrained faster moving components of the fluid mixture removed therefrom, and
(iv) being isolated and treated to remove any slower moving components of the fluid mixture; the compartment being fed with fluid mixture to be separated being a compartment through which the carrier fluid passes.

The sequential operation of the valves simulates rotation of the closed loop column in a direction counter current to the movement of the carrier liquid. Separation occurs when the relative rates of flow of the liquid dextran-containing mixture to be separated and the carrier liquid, together with the rate of 'apparent rotation' of the closed loop column are adjusted with respect to the relative retention of the two fractions of the dextran mixture to be separated so that the rate of 'apparent rotation' of the stationary, packed column is slower than the faster moving fraction, but not slower than the slower moving fraction.

Thus according to our invention we provide a method for separation of a mixture of dextrans of differing molecular weights into two fractions, which comprises passing a solution of the mixture through the above-described apparatus.

It will be appreciated that the method described above will only separate the dextran into two fractions of the differing mean molecular weight. If, as is generally the case with clinical dextran, it is desired to eliminate (or at least decrease considerably the concentration of) dextrans of both too high and too low molecular weights it will be necessary either to pass the dextran through the apparatus twice using different, but appropriately adjusted conditions, or it will be necessary to pass the dextran through two sets of apparatus one set to remove material of too high a molecular weight and one set to remove material of too low a molecular weight.

The carrier fluid used in the process may be any convenient solvent in which the dextran is soluble, for example dimethylsulphoxide, dimethylformamide, ethanolamine, a lower (i.e., C 1 to 6) alkanol or, especially water, or admixtures thereof. In order to prevent or inhibit bacterial growth when water is used, it is sometimes preferred to use water containing from about 5 to 15% by weight of a lower alkanol, e.g. ethanol.

The fluid feed to the chromatograph column preferably comprises a solution of the dextran to be separated in the same solvent as is used in the carrier fluid. The feed preferably contains from about 5% to 30% and preferably from about 20% to 30% by weight of dextran.

The process of the invention may be carried out at a temperature on the column of from about 5° to 150° C, higher pressures enabling the higher temperatures. Bacterial growth may be prevented or inhibited when water is the sole solvent by employing temperatures of from 70° C to 100° C, and these conditions are preferred. When a non-aqueous solvent or a solvent mixture is employed, however, the temperature is preferably from 20° to 50° and more preferably from 40° to 50° C.

The process may be carried out at any suitable pressure drop across the column. Thus, the internal column pressure may range from below atmospheric pressure, but preferably above, to any pressure which the materials of construction of the column can withstand. Thus pressures of up to about 200 psi can normally be accommodated using steel (e.g. stainless steel) apparatus and a suitably presure resistant packing.

The packing used in the columns may be any convenient packing on which the dextran is selectively retarded dependant on molecular weight, e.g. porous silica, cross-linked dextrans (e.g. those known as 'Sephadex'), cross-linked methacrylate polymers (e.g. those known as 'Hydrogel' or 'Spheron'), porous glass, cross-linked polystyrene, or agarose gels (e.g. those known as 'Sepharose'). The packing should enable a good flow rate to be achieved, and should be substantially incompressible, at the operating pressure, thus the 'Sephadex' and 'Sepharose' packings may only be used at vary low pressure drops across the column. The packing should not be significantly soluble or suspendable in the solvent systems used for the dextran. The packing where it is a solid packing preferably has a pore diameter in the range 50 to 5,000 and more preferably 100 to 500 Angstrom units. In particular we prefer to use porous silica or a cross-linked methacrylate polymer with an approximately 300 Angstrom unit pore diameter as the packing.

The separation is preferably carried out at a pH of from about 4 to 8 and preferably 5 to 7.

As has been menioned above bacterial growth can be prevented or inhibited by using an aqueous alcoholic solution of dextran in the process, or by using a high temperature. Another factor which helps to prevent bacterial growth is the use of high concentrations of dextran (within the ranges given above). If desired however a bactericide, e.g. sodium azide, may be included in the liquid phase, and any bactericide remaining in the eluted product may, if necessary, be removed subsequently using conventional techniques.

The product from the process of the invention may be further purified, concentrated, e.g. by evaporation, and if desired dried, e.g. by spray drying, to yield a dry product.

We have found that dextran may be used at comparatively high concentrations and viscosities in the process of the present invention in contradistinction to other chromatographic processes. In addition, we have found that the process enables a much sharper separation of the dextran fractions to be achieved than in the processes employed hitherto.

The two dextran fractions taken from the apparatus can be taken from points which are equidistant from the feed inlet or which are separated by different distances from the feed inlet. The optimum distance from the feed inlet at which to take the two fractions can be readily determined by simple experiment.

The invention is illustrated, but in no way limited by the following Examples.

EXAMPLE 1

An apparatus as described in British Patent No. 1,418,503 made up of 10 compartments each 5.1 cm in diameter and 70 cms long packed with 'Spherosil XOBO75' silica packing of particle size 200 to 500 microns was used. A sequencing interval of 17 minutes was used to remove about 6% of the high molecular weight end of the feed distribution.

The conditions used in and results of the fractionation are summarised in the following table.

| Stream Designation | Flow Rate ml/min | Stream Composition | Position of inlet or outlet stream relative to isolated compartments |
|---|---|---|---|
| Carrier Fluid | 36.5 | Distilled water | Isolated compartment +1 |
| Fluid through isolated compartment | 185 | Distilled water | Isolated compartment |
| Feed | 17.1 | 20.6% w/v dextran 40 in distilled water + 0.02% sodium azide 0.42% w/v dextran in distilled water | Isolated compartment +5 |
| High M.W. product | 53.6 | 1.78% w/v dextran in distilled water | Isolated compartment +9 |
| Low M.W. product | 185 | distilled water | Isolated compartment |

Chromatographic Equipment Made Up Of 10 Compartments 5.1 cm Dia × 70 cm Long Packing Material Spherosil XOBO75 Particle Size (200–500μm) Sequencing Interval = 17 Minutes To Remove ~6% Of High M.W. End Of The Feed Distribution.

Compartments have been numbered in the direction of carrier fluid flow.

EXAMPLE 2

In further runs using the method and apparatus of Example 1, but with differences as set out in the following table, the following separations were achieved at room temperature of Dextran 40 (mean molecular weight 40,000)

| Run | Feed Conc (%) | High molecular wt product | | Low molecular wt product | |
|---|---|---|---|---|---|
| | | conc (%) | mean molecular wt | Conc (%) | mean molecular wt |
| A | 1.11 | 0.06 | 70000 | 0.03 | 20000 |
| B | 20.9 | 0.37 | 82000 | 0.50 | 26000 |
| C | 19.6 | 0.42 | 66000 | 0.72 | 26000 |
| D | 20.55 | 0.25 | 82000 | 0.38 | 29000 |
| E | 26.5 | 0.93 | 64000 | 2.16 | 22000 |

| Run | Feed flow rate (ml/min) | Mobile phase flow rates (ml/min) | | | Sequence interval (min) | Dextran throughput (gm/hr) | Pressure in carrier fluid input compartment (psi) |
|---|---|---|---|---|---|---|---|
| | | Pre-feed | Post-feed | Purge | | | |
| A | 10.1 | 49.3 | 59.4 | 244 | 15.0 | 7 | 15 |
| B | 10.0 | 50.4 | 60.4 | 272 | 15.0 | 125 | 40 |
| C | 20.0 | 102.1 | 122.1 | 455 | 7.5 | 236 | 90 |
| D | 10.1 | 99.8 | 109.8 | 413 | 7.5 | 124 | 55 |
| E | 40.1 | 99.6 | 139.6 | 420 | 7.5 | 638 | 210 |

What we claim is:

1. A method for separation of a fluid mixture of dextrans of differing molecular weights into two fractions, which comprises
   (a) passing said mixture into chromatographic apparatus which comprises a plurality of compartments which contain a chromatographic packing material, valve-containing conduits interconnecting the compartments to provide a closed loop column, at least one additional valve controlled fluid inlet and at least one additional valve controlled fluid outlet for each compartment, and means for sequential operation of the valves, and
   (b) operating the valves sequentially such that each compartment undergoes, and at any one time there is at least one compartment undergoing, the following operations:
      (i) being fed with the fluid mixture to be separated,
      (ii) being fed with a carrier fluid,
      (iii) having carrier fluid and any entrained faster moving components of the fluid mixture removed therefrom, and
      (iv) being isolated and treated to remove any slower moving components of the fluid mixture; the compartment being fed with fluid mixture to be separated being a compartment through which the carrier fluid passes.

2. A method accoding to claim 1 wherein the fluid mixture of dextrans fed to the apparatus comprises a solution of the dextrans in a solvent therefor.

3. A method according to claim 2 wherein the solvent comprises dimethylsulphoxide, dimethylformamide, ethanolamine, a C 1 to 6 alkanol or water, or a mixture thereof.

4. A method according to claim 1 wherein the fluid mixture of dextrans fed to the apparatus contains from 3 to 30% by weight of said dextrans.

5. A method according to claim 4 wherein the fluid mixture of dextrans fed to the apparatus contains from 20 to 30% by weight of said dextrans.

6. A method according to claim 1 wherein the carrier fluid employed comprises dimethylsulphoxide, dimethylformamide, ethanolamine, a C 1 to 6 alkanol or water, or a mixture thereof.

7. A method according to claim 1 wherein the pressure in the column is above atmospheric pressure.

8. A method according to claim 1 wherein the packing material in the column is porous silica, a cross-linked dextran, a cross-linked methacrylate polymer, porous glass, cross-linked polystryrene, or an agarose gel.

9. A method according to claim 1 wherein the packing material is a solid packing material having a pore diameter in the range 50 to 5,000 Angstrom units.

10. A method according to claim 9 wherein the pore diameter is in the range 100 to 500 Angstrom units.

11. A method according to claim 1 wherein the pH on the column is from 4 to 8.

* * * * *

UNITED STATES PATENT AND TRADEMARK OFFICE
CERTIFICATE OF CORRECTION

PATENT NO. : 4,104,078
DATED : August 1, 1978
INVENTOR(S) : Philip Edwin Barker, Brian William Hatt and
Frederick John Ellison It is certified that error appears in the above-identified patent and that said Letters Patent are hereby corrected as shown below:

Column 1, line 40, change "value" to "valve"

Column 1, line 42, insert the word "valve" after word "additional"

Column 2, line 8, Delete the word "the" after "of"

Column 2, line 50, change "presure" to "pressure"

Column 2, line 62, change "vary" to "very"

Column 3, line 5, change "menioned" to "mentioned"

Column 4, line 59, change "accoding" to "according"

Signed and Sealed this

Sixth Day of February 1979

[SEAL]

Attest:

RUTH C. MASON
Attesting Officer

DONALD W. BANNER
Commissioner of Patents and Trademarks